United States Patent
Quinn et al.

(10) Patent No.: US 9,668,088 B2
(45) Date of Patent: May 30, 2017

(54) DYNAMIC SPECTRUM SHARING FOR WIRELESS LOCAL AREA NETWORKS

(71) Applicant: Dell Products, LP, Round Rock, TX (US)

(72) Inventors: Liam B. Quinn, Austin, TX (US); Liam Prendergast, Limerick (IE)

(73) Assignee: Dell Products, LP, Round Rock, TX (US)

( * ) Notice: Subject to any disclaimer, the term of this patent is extended or adjusted under 35 U.S.C. 154(b) by 42 days.

(21) Appl. No.: 14/263,513

(22) Filed: Apr. 28, 2014

(65) Prior Publication Data
US 2015/0312891 A1 Oct. 29, 2015

(51) Int. Cl.
*H04W 72/04* (2009.01)
*H04W 4/02* (2009.01)
*H04W 16/14* (2009.01)

(52) U.S. Cl.
CPC ............. *H04W 4/02* (2013.01); *H04W 16/14* (2013.01)

(58) Field of Classification Search
CPC .............................. H04W 72/044; H04W 4/02
See application file for complete search history.

(56) References Cited

U.S. PATENT DOCUMENTS

| | | | |
|---|---|---|---|
| 7,817,960 B2 | 10/2010 | Tan et al. | |
| 8,462,751 B1 | 6/2013 | Dehghan et al. | |
| 2005/0239451 A1* | 10/2005 | Periyalwar | H04W 52/383 455/425 |
| 2009/0232243 A1 | 9/2009 | Tsuboi et al. | |
| 2010/0056132 A1* | 3/2010 | Gallagher | 455/422.1 |
| 2010/0159957 A1* | 6/2010 | Dando et al. | 455/456.5 |
| 2011/0001658 A1* | 1/2011 | Noble et al. | 342/107 |
| 2011/0164580 A1* | 7/2011 | Keon | 370/329 |
| 2011/0205941 A1 | 8/2011 | Stanforth | |
| 2011/0261735 A1* | 10/2011 | Cordeiro | 370/310 |
| 2012/0302273 A1 | 11/2012 | Lin et al. | |
| 2013/0095845 A1* | 4/2013 | Lim et al. | 455/452.2 |
| 2013/0288689 A1* | 10/2013 | Choi-Grogan et al. | 455/444 |
| 2013/0293416 A1* | 11/2013 | Waters | G01S 19/48 342/357.31 |
| 2014/0274089 A1* | 9/2014 | Hassan | H04W 24/02 455/452.1 |

* cited by examiner

*Primary Examiner* — Kashif Siddiqui
*Assistant Examiner* — Minjung Kim
(74) *Attorney, Agent, or Firm* — Larson Newman, LLP (57) ABSTRACT

A method in a wireless dock includes querying a first wireless networking database to identify a first set of available channels, querying a second wireless networking database to identify a second set of available channels, and sending location and device attributes. The method also includes receiving a list of permissible frequencies and power levels, sending to a client device at least a portion of the list of the permissible frequencies and the power levels for use of selected channels selected from the first set of the available channels and the second set of the available channels, and communicating with the client device using selected frequencies and power levels selected from the at least the portion of the list of the permissible frequencies and the power levels.

14 Claims, 5 Drawing Sheets

DYNAMIC SPECTRUM SHARING FOR WIRELESS LOCAL AREA NETWORKS

FIELD OF THE DISCLOSURE

This disclosure generally relates to information handling systems, and more particularly relates to dynamic spectrum sharing for wireless local area networks in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. Information handling systems are increasingly relied upon for personal and business activities.

BRIEF DESCRIPTION OF THE DRAWINGS

Embodiments incorporating teachings of the present disclosure are shown and described with respect to the drawings presented herein, in which.

The use of the same reference symbols in different drawings indicates similar or identical items.

DETAILED DESCRIPTION

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
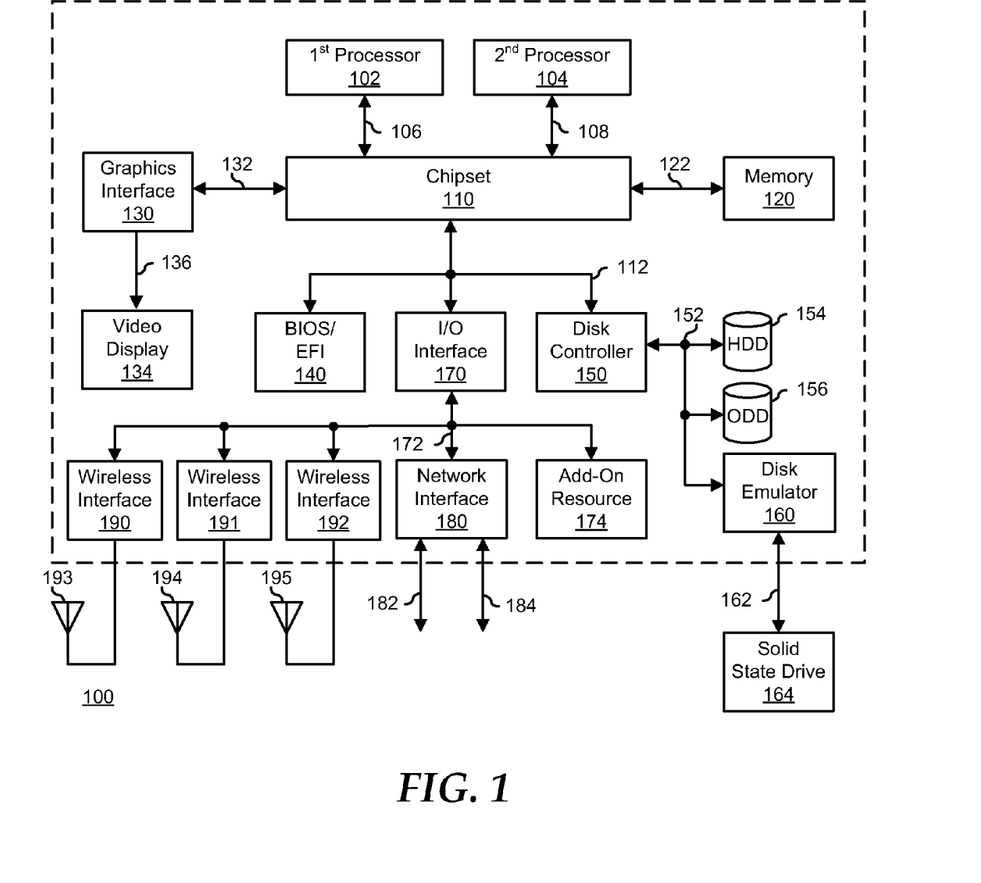
FIG. 1 is a block diagram of an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Information handling system 100 can be include several of such items, each including at least a portion of the elements shown in FIG. 1. For example, information handling system 100 can include one or more client devices, one or more wireless docks, one or more wireless local area network (WLAN) access points (APs), combinations thereof, and the like. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes processors 102 and 104, a chipset 110, a memory 120, a graphics interface 130, includes a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174, to network interface 180, and to wireless interfaces 190, 191, and 192. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof. Wireless interfaces 190, 191, and 192 are connected to antennas 193, 194, and 195, respectively. Wireless interfaces 190, 191, and 192 can, for example, provide communications with infrastructure devices, such as wireless docks and access points (APs), and with client devices, such as computers, tablets, telephones, combinations thereof, and the like. Wireless interfaces 190, 191, and 192 can, for example, operate using diverse technologies, such as diverse frequency bands, diverse bandwidths, diverse protocols, diverse coverage areas, diverse modes, such as an infrastructure mode for communicating between a client device and an infrastructure device and a Peer-to-Peer (P2P) mode for communicating between client devices, combinations thereof, and the like. As an example, any number of wireless interfaces may be provided, for example, one or more for 2.4 GHz Wi-Fi, one or more for 5 GHz Wi-Fi, one or more for 60 GHz WiGig, one or more for Television White Spaces (TVWS), one or more for Bluetooth (BT), one or more for Bluetooth Low Energy (BT LE) and one or more for other wireless interfaces.

Network interface 180 represents a Network Interface Card (NIC) disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
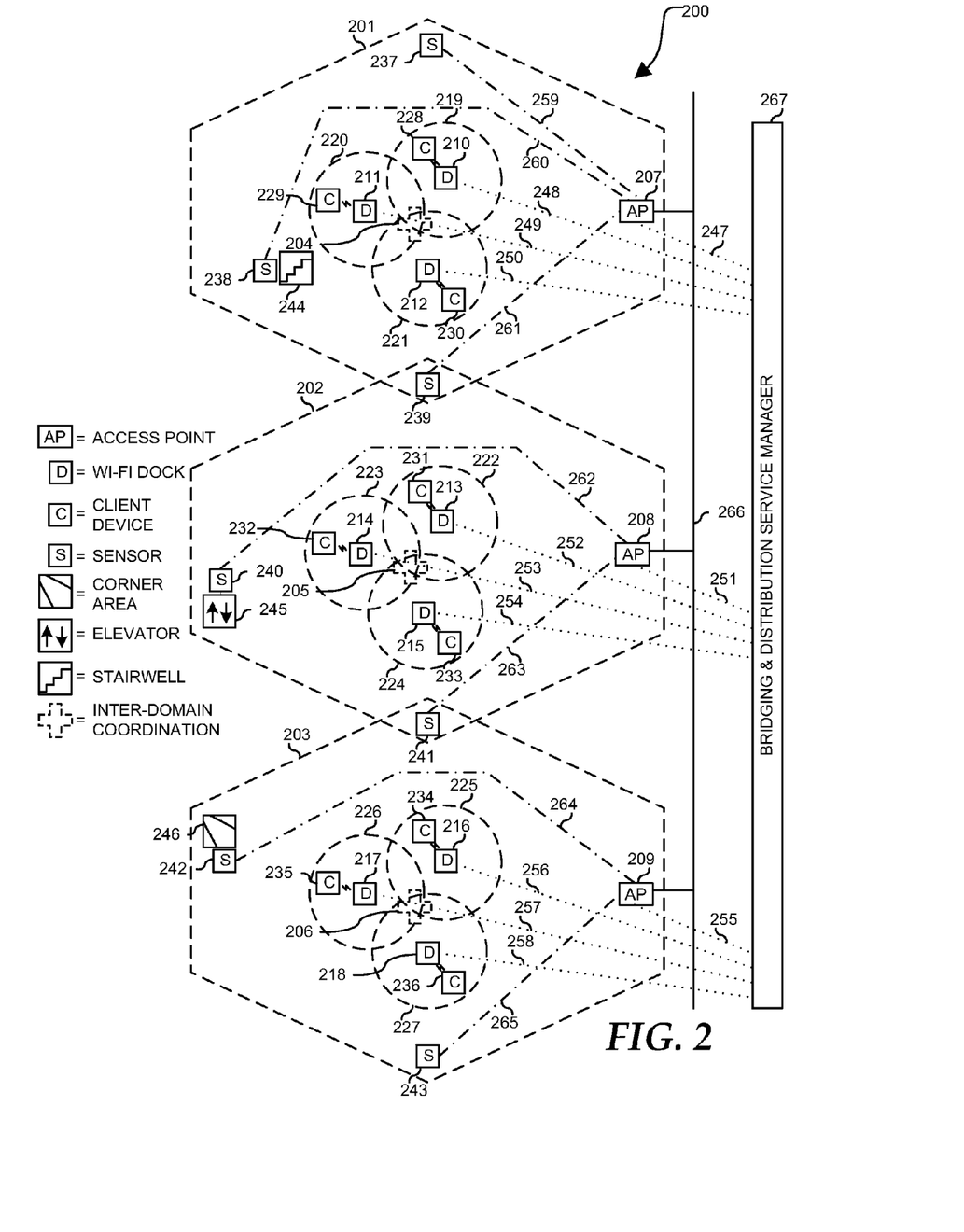
FIG. 2 is a diagram of a system according to an embodiment of the present disclosure.

FIG. 2 shows a system 200 including a bridging and distribution service manager 267, access points (APs) 207, 208, and 209, wireless docks 210 through 218, client devices 228 through 236, and sensors 237 through 243. AP 207 provides coverage area 201. AP 208 provides coverage area 202. AP 209 provides coverage area 203. Wireless docks 210 through 218 provide coverage areas 219 through 227, respectively. Cross symbols 204, 205, and 206 depict inter-domain coordination for the respective wireless docks within which they are centered. Cross symbol 204 depicts inter-domain coordination between wireless docks 210, 211, and 212. Cross symbol 205 depicts inter-domain coordination between wireless docks 213, 214, and 215. Cross symbol 206 depicts inter-domain coordination between wireless docks 216, 217, and 218.

Sensors 237 through 243 detect signals of client devices and enable determination of geolocation information from such signals. Some sensors can be placed near a periphery of a coverage area of an AP. For example, sensors 237 and 239 are placed near a periphery of coverage area 201 of AP 207, sensors 239 and 241 are placed near a periphery of coverage area 202 of AP 208, and sensors 241 and 243 are placed near a periphery of coverage area 203 of AP 209. As can be seen in FIG. 2, the periphery of the coverage area of one AP may overlap the periphery of the coverage area of another AP. For example, coverage area 201 of AP 207 and coverage area 202 of AP 208 overlap, with sensor 239 located in the common portion of coverage areas 201 and 202, and coverage area 202 of AP 208 and coverage area 203 of AP 209 overlap, with sensor 241 located in the common portion of coverage areas 202 and 203. Sensors may be located in such common portions of multiple coverage areas or may be located within only a single coverage area.

Some sensors can be placed in anomalous areas of their respective coverage areas. For example, sensor 238 is located in or near stairwell 244 of coverage area 201 of AP 207. As another example, sensor 240 is located in or near elevator 245 of coverage area 202 of AP 208. As yet another example, sensor 242 is located in or near corner area 246 of coverage area 203 of AP 209. Such anomalous areas can be areas where wireless signal propagation is difficult and where a client device may not be reliably detectable by other sensors. Thus, for example, sensor 240 may reliably provide geolocation information of a client device in elevator 245 when other sensors may not detect signals from the client device, for example, because of electromagnetic shielding provided by the metallic structure of elevator 245.

A sensor may communicate with at least one AP. For example, sensor 237 communicates with AP 207 via communication path 259, sensor 238 communicates with AP 207 via communication path 260, and sensor 239 communicates with AP 207 via communication path 261. As another example, sensor 240 communicates with AP 208 via communication path 262, and sensor 241 communicates with AP 208 via communication path 263. As yet another example, sensor 242 communicates with AP 209 via communication path 264, and sensor 243 communicates with AP 210 via communication path 265. APs are networked together, for example, via network 266. Such networking can unify the coverage areas, such as coverage areas 201, 202, and 203, into an aggregate coverage area, for example, at a building level, an enterprise level, or the like.

A bridging and distribution service manager 267 is provided. Bridging and distribution service manager 267 can provide coordination between wireless docks, such as inter-domain coordination 204, 205, and 206, coordination between wireless docks and APs, such as coordination between wireless dock 210 and AP 207, and coordination between APs, such as coordination between AP 207 and AP 208. With respect to coverage area 201, communication paths to enable coordination provided by bridging and distribution service manager 267 include communication path 247 from bridging and distribution service manager 267 to AP 207, communication path 248 from bridging and distribution service manager 267 to wireless dock 210, communication path 249 from bridging and distribution service manager 267 to wireless dock 211, communication path 250 from bridging and distribution service manager 267 to wireless dock 212. With respect to coverage area 202, communication paths to enable coordination provided by bridging and distribution service manager 267 include communication path 251 from bridging and distribution service manager 267 to AP 208, communication path 252 from bridging and distribution service manager 267 to wireless dock 213, and communication path 253 from bridging and distribution service manager 267 to wireless dock 214, and communication path 254 from bridging and distribution service manager 267 to wireless dock 215. With respect to coverage area 203, communication paths to enable coordination provided by bridging and distribution service manager 267 include communication path 255 from bridging and distribution service manager 267 to AP 209, communication path 256 from bridging and distribution service manager 267 to wireless dock 216, communication path 257 from bridging and distribution service manager 267 to wireless dock 217, and communication path 258 from bridging and distribution service manager 267 to wireless dock 218. Bridging and distribution service manager 267 may be implemented, for example, in one or more of APs 207, 208, and 209, in one or more of wireless docks 210 through 218, in a separate entity, in combinations thereof, and the like.

Figure 3:
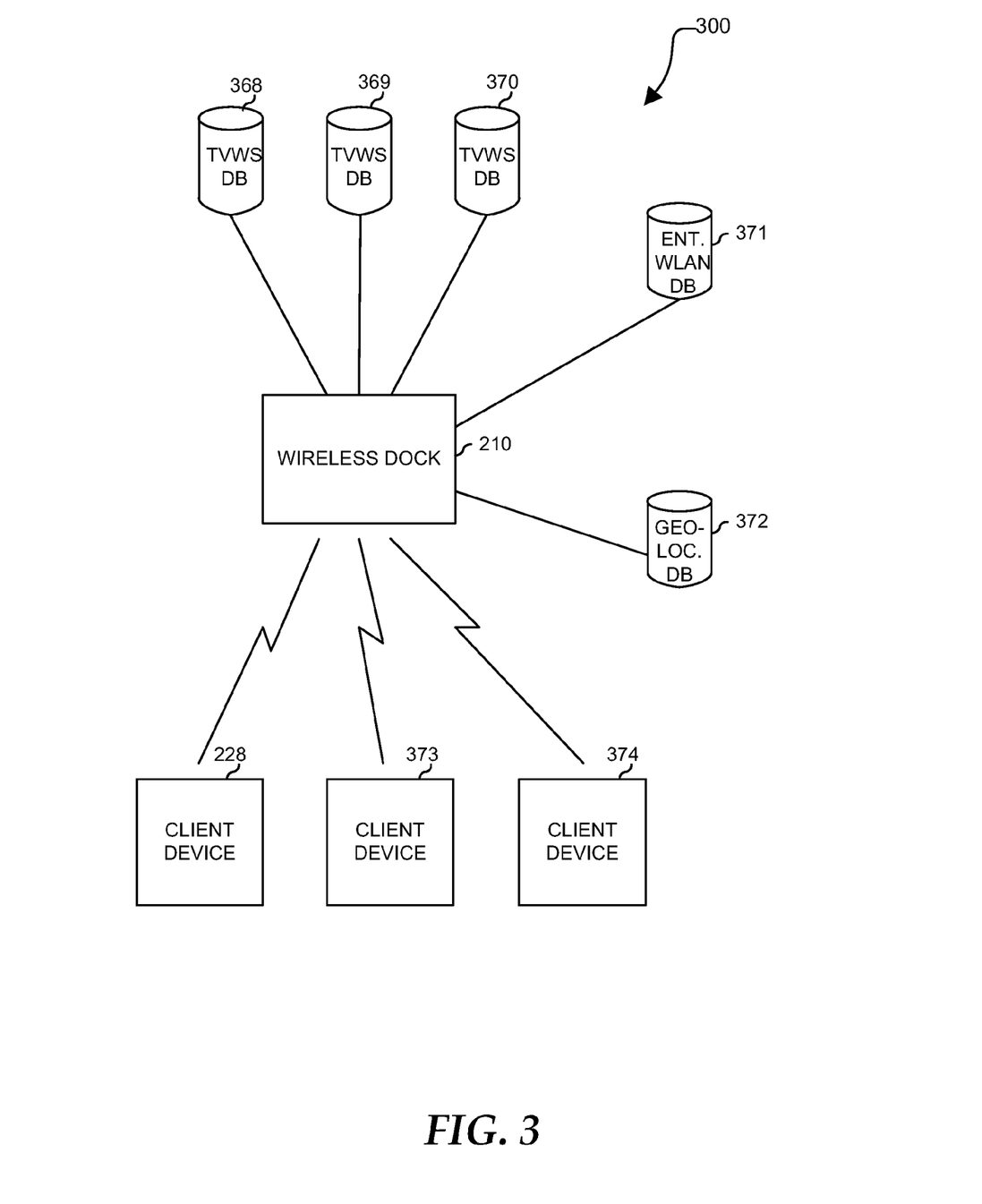
FIG. 3 is a block diagram of a system according to an embodiment of the present disclosure.

FIG. 3 shows a system 300 including a wireless dock 210, one or more client devices 228, 373, and 374, one or more wireless network databases, such as television white space (TVWS) databases 368, 369, and 370, one or more wireless local area network (WLAN) databases, such as enterprise WLAN database 371, and one or more geolocation databases, such geolocation database 372. TVWS databases 368, 369, and 370 can, for example, be TVWS databases of different providers, enabling wireless dock 210 to coordinate TVWS communication via different TVWS systems. Enterprise WLAN database 371 can store information pertaining to WLAN APs, such as geographic locations of APs, frequency coordination (e.g., channel allocations) of APs, coverage areas of APs, network connectivity between APs, combinations thereof, and the like. Geolocation database 372 can store information mapping signal detection parameter values, such as received signal strength indications (RSSIs), to geographic locations of client devices emanating the signals being detected by geographically diverse sensors. Based on information accessible to wireless dock 210 from TVWS DBs 368, 369, and 370, wireless dock 210 can direct a client device, such as any of client devices 228, 373, and 374, to utilize a suitable TVWS system for communication. Based on information accessible to wireless dock 210 from enterprise WLAN database 371, wireless dock 210 can direct a client device to efficiently utilize WLAN infrastructure, such as one or more APs. Based on information accessible to wireless dock 210 from geolocation database 372, wireless dock 210 can direct a client device to optimize its communication choices based on its location relative to the coverage areas of infrastructure devices or client devices offering such communication choices. Based on combinations of the above information, wireless dock 210 can, for example, obtain geolocation information pertaining to a client device, compare the geolocation information to coverage areas of TVWS systems and WLAN infrastructure, and direct the client device to utilize communication options most suitable to its geographic location.

Figure 4:
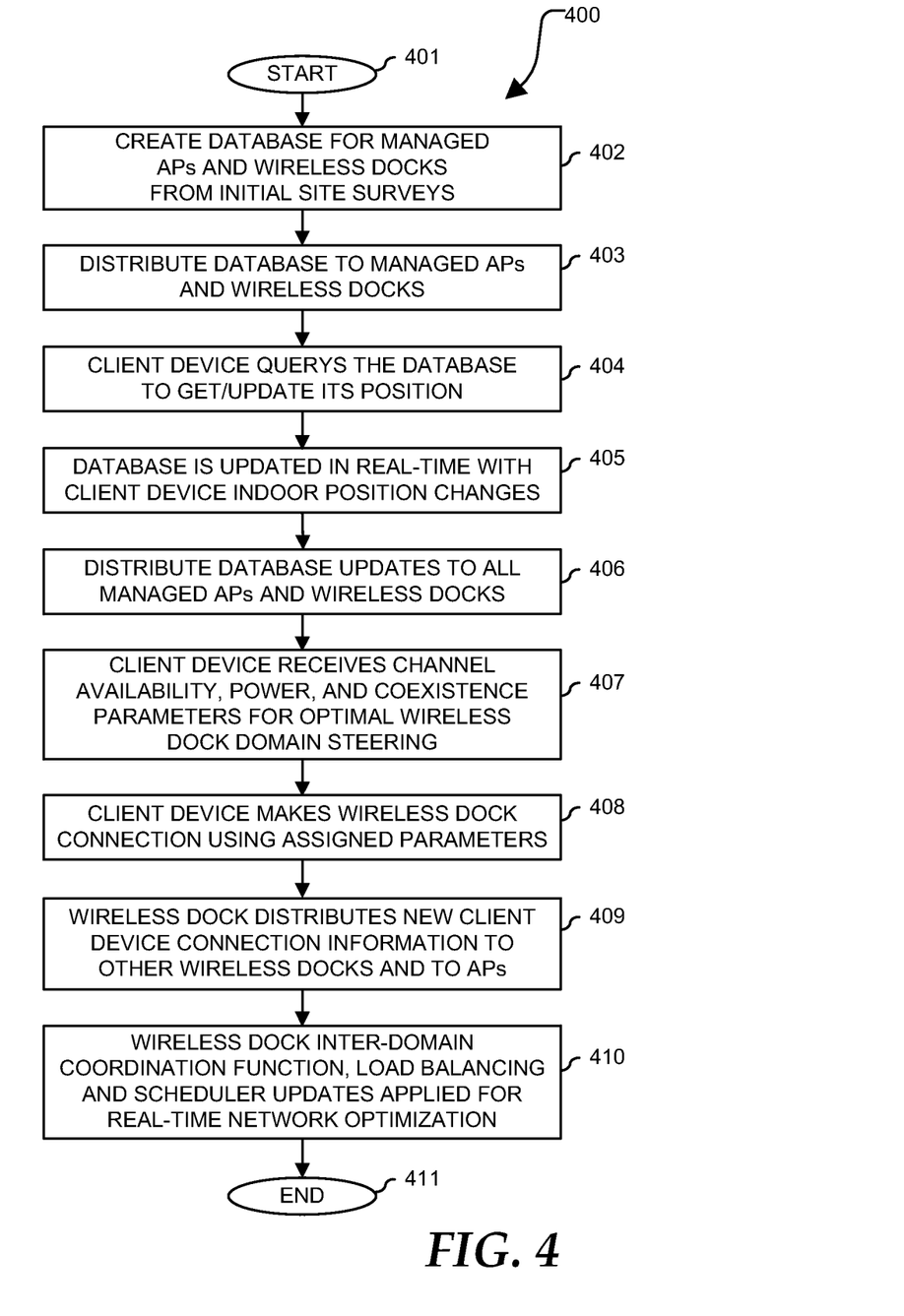
FIG. 4 is a flowchart diagram of a method for dynamic spectrum management for wireless local area networks (WLANs) according to an embodiment of the present disclosure.

FIG. 4 is a flowchart diagram of a method 400 for dynamic spectrum management for wireless local area networks (WLANs) according to an embodiment of the present disclosure. Method 400 begins in block 401. From block 401, method 400 continues to block 402. In block 402, a database is created for managed APs and wireless docks from initial site surveys. The database includes the indoor position for each managed AP and wireless dock. From block 402, method 400 continues to block 403. In block 403, a database is distributed to managed APs and wireless docks. From block 403, method 400 continues to block 404. In block 404, a client queries the database to get their position. Such position may have been obtained by storing in the database the position of the client after such position was determined by sensors detecting signals from the client and determining the client's position based on the signals. If their position is to be updated, the clients may update their position. From block 404, method 400 continues to block 405. In block 405, the database is updated in real-time with client indoor position changes. The database also receives dynamic channel and RSSI threshold updates from wireless docks and sensors. From block 405, method 400 continues to block 406. In block 406, database updates are distributed to all managed APs and wireless docks. A bridging and distribution service manager enables dynamic updating of all registered wireless dock equipment tables. From block 406, method 400 continues to block 407. In block 407, a client receives channel availability, power, and coexistence parameters for optimal wireless dock domain steering. Client devices are provided with wireless dock parameters for a "best quality" wireless-dock-centered connection domain with least channel contention.

From block 407, method 400 continues to block 408. In block 408, the client makes a wireless dock connection using assigned parameters. A client device connects to a wireless dock using an assigned frequency channel and other connectivity parameters. From block 408, method 400 continues to block 409. In block 409, the wireless dock distributes new client connection information to other wireless docks and APs. The wireless dock sends new connection information to other wireless docks and APs so they can also update their tables. From block 409, method 400 continues to block 410. In block 410, wireless dock inter-domain coordination function, load balancing, and scheduler updates are applied for real-time network optimization. Dynamic database updating and sharing distributes information around the system to enable continuous network optimization. From block 410, method 400 continues to block 411, where it ends.

Figure 5:
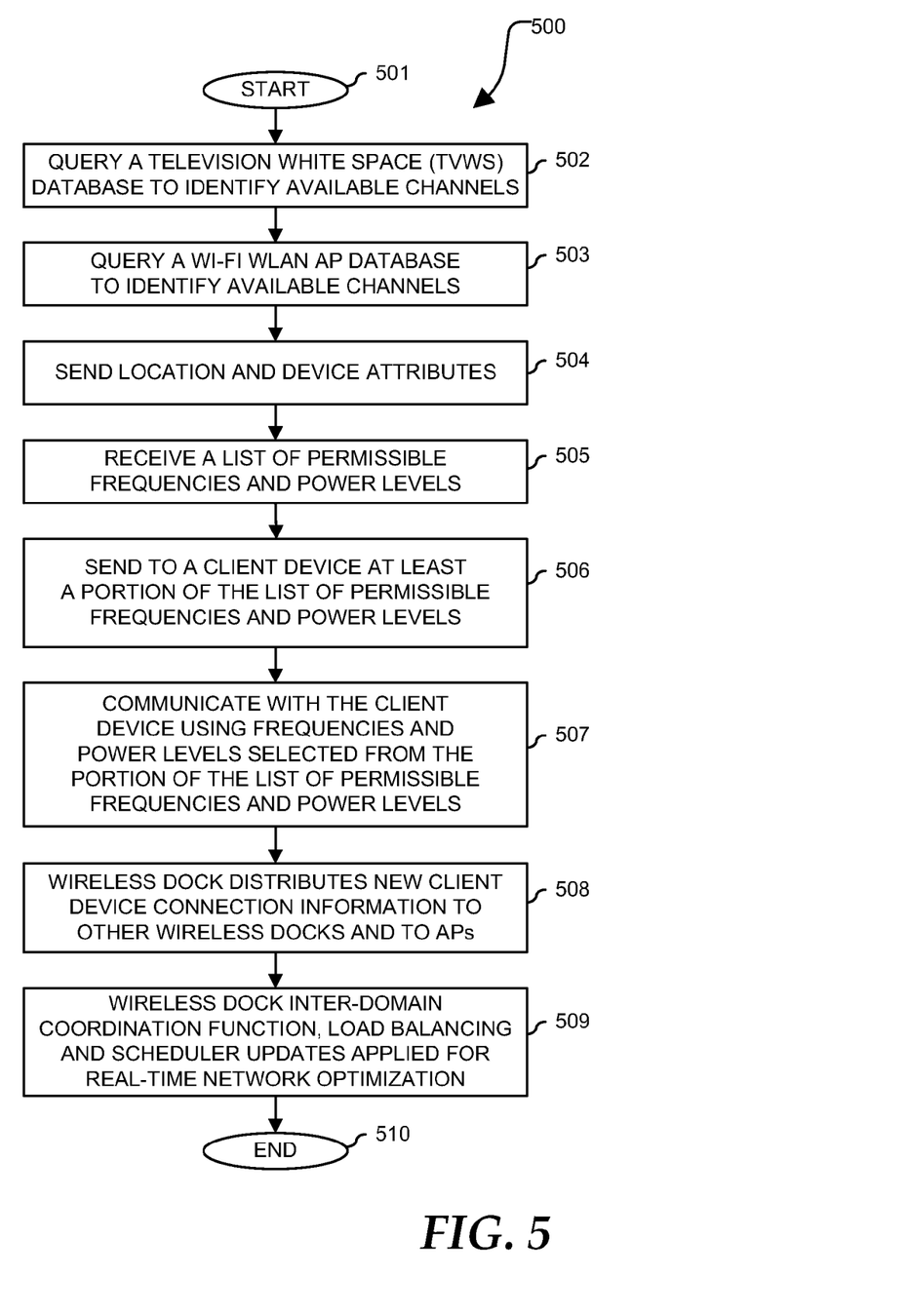
FIG. 5 is a flowchart diagram of a method for dynamic spectrum management for wireless local area networks (WLANs) according to an embodiment of the present disclosure.

FIG. 5 is a flowchart diagram of a method 500 for dynamic spectrum management for wireless local area networks (WLANs) according to an embodiment of the present disclosure. Method 500 begins in block 501. From block 501, method 500 continues to block 502. In block 502, a Television White Space (TVWS) database (DB) is queried to identify available TVWS channels. From block 502, method 500 continues to block 503. In block 503, a Wi-Fi WLAN AP database (DB) is queried to identify available channels. From block 503, method 500 continues to block 504. In block 504, location and device attributes are sent. From block 504, method 500 continues to block 505. In block 505, a list of permissible frequencies and power levels is received. From block 505, method 500 continues to block 506. In block 506, at least a portion of the list of permissible frequencies and power levels is sent to a client device. From block 506, method 500 continues to block 507. In block 507, communication with the client device is performed using frequencies and power levels selected from at least the portion of the list of permissible frequencies and power levels. From block 507, method 500 continues to block 508. In block 508, the wireless dock distributes new client device connection information to other wireless docks and to APs. From block 508, method 500 continues to block 509. In block 509, wireless dock inter-domain coordination, wireless networking load balancing, and wireless networking scheduler updates are applied for real-time network optimization. From block 509, method 500 continues to block 510, where method 500 ends.

At least one embodiment accommodates increased network congestion in wireless networking using unlicensed spectrum, based on the growth of wirelessly networked devices, such as Wi-Fi devices, by dynamically managing the sharing of spectrum among multiple frequency bands. While the 2.4 GHz Wi-Fi band is often more congested, it is also more commonly accessible to client devices, so it can serve, for example, as a medium by which to exchange messages to arrange the spectrum sharing among multiple frequency bands. While the 5 GHz Wi-Fi band is typically less congested and can be used to facilitate high bandwidth communications even when the 2.4 GHz Wi-Fi band is congested. As more devices are being deployed in the 5 GHz Wi-Fi frequency band with 802.11n and 802.11ac based devices, support for utilization of additional frequency bands is beneficial. Also, new usage cases arise for Wi-Fi, particularly in enterprise deployments, where the use of peer-to-peer connectivity presents significant new challenges for efficient spectrum utilization and end user performance, and support for utilization of additional frequency bands can be helpful for overcoming such challenges. As WiGig, operating in the 60 GHz band, is now part of the Wi-Fi portfolio of media access control link layer/physical layer (MAC/PHY) wireless technologies, support across multiple Wi-Fi frequency bands can provide a harmonious solution to challenges by dynamically optimizing use of communication paths over the various frequency bands to account for network congestion, available bandwidth, feasible distance ranges, permissible power levels, combinations thereof, and the like.

Television White Spaces (TVWS) provide another wireless networking medium, using Wi-Fi based radio technology, to access spectrum allocated to, but unused for, television broadcasting when and where it is available to enhance connectivity options, networking efficiency, and capacity optimization. By dynamically utilizing available frequency channels across the Wi-Fi bands and by dynamically aggregating unused channels where appropriate, throughput performance is increased while maintaining the best quality of experience features for the applications for each user.

Design and system elements used in WLAN network configuration in some solution components for dense enterprise Wi-Fi environments according to at least one embodiment include real-time spectrum sensing, received signal strength indication (RSSI) measurements, a distributed dynamic database of enterprise connectivity clients shared across all APs and Wi-Fi docks connected to the enterprise, an Extended Service Set (ESS) backbone, a coordination function and network allocation vector (network access countdown timer) that is optimized for simultaneous Base Service Set (BSS) and P2P connectivity scenarios, a multi-band multi-channel concurrency feature for simultaneous connections, enhanced inter-band and intra-band channel aggregation/bonding, optional use of BT LE Proximity for P2P device ranging detection, Wi-Fi indoor positioning (e.g., based on RSSI fingerprinting and database-lookup), Low-Power Wi-Fi capability, Wi-Fi docking stations, and sensors that provide RSSI reports to the local Wi-Fi database for WLAN environment information updating for querying by clients.

At least one embodiment may utilize indoor position determination by client devices, infrastructure APs, and Wi-Fi docks, a distributed local database that contains WLAN channel and positioning information, creation of Wi-Fi dock domains that cluster clients in P2P groups that are contention-free or have minimal contention for operating channels used within the domain, a proposed new inter-domain optimized coordination and co-existence function that works in concert with existing WLAN MAC distributed coordination function and optional point coordination function, WLAN channel occupancy/vacancy threshold real-time monitoring via WLAN devices, and also dedicated sensors in select enterprise building locations, as well longer-term profiling, together with a dynamic threshold adaptation capability mechanism.

In accordance with at least one embodiment, client devices that wish to make a P2P connection with any Wi-Fi dock associates with an infrastructure AP in a dense enterprise environment to update the indoor positioning information for the client devices and then receive back WLAN channel availability & usage parameters via local database query. Several indoor positioning determination technologies that can be utilized, such as fixed location beacons (e.g., using BT LE), inertial sensors (gyroscopes, accelerometers, compasses), radio frequency identification (RFID), light emitting diodes (LEDs), global navigation satellite system (GNSS), Assisted-GNSS, Wi-Fi fingerprinting, combinations thereof, and the like. These can be integrated using hybrid/fusion and/or simultaneous location and mapping (SLAM) techniques and can be implemented as part of a real-time location solution (RTLS). The client devices, Wi-Fi docks, and infrastructure APs support one or more of the underlying technologies to enable positioning determination in the enterprise environment.

In accordance with at least one embodiment, the local database contains information descriptive of the WLAN environment for the Wi-Fi nodes in the enterprise. The local database receives real-time positioning and channelization parameter updates from the nodes and uses a bridging and distribution service function in the APs and Wi-Fi docks to distribute the database across all managed wireless equipment infrastructure (non-client-device) nodes. The local database also receives real-time reports from sensor nodes that are selectively placed throughout the enterprise (e.g., in stairways, elevators, etc.). Dynamic updating of the local database optimizes the channel reuse plan that is based on the enterprise IT design and deployment derived from site surveys. The channel optimization converges to create domains centered on each managed Wi-Fi dock that segments serving frequencies for use by small groups of client devices for contention minimization within the domain. Additionally, with this approach domain clustering is provided based on spatial channel reuse and power settings.

In accordance with at least one embodiment, a further fine-tuning is performed by utilizing an inter-domain coordination function that shares co-existence parameters between domains. This inter-domain coordination function uses the underlying WLAN MAC distributed coordination function but is optimized for neighboring domain adjacent channel and co-channel interference mitigation. In accordance with at least one embodiment, cross-domain intelligent load-balancing and per-frame radio resource scheduling are performed for spectral efficiency and enterprise WLAN capacity maximization.

In accordance with at least one embodiment, spectrum efficient wireless docking of client devices is provided. For example, in a tri-band configuration (e.g., 2.4 GHz Wi-Fi, 5 GHz Wi-Fi, and 60 GHz WiGig), any or all of the three bands are used for communication by client devices in accordance with the capabilities, requirements, and locations of the client devices, the network congestion of different frequency bands, and permissible frequencies and power levels. As another example, in a quad-band configuration (e.g., 2.4 GHz Wi-Fi, 5 GHz Wi-Fi, 60 GHz WiGig and TVWS), any or all of the four bands are used for communication by client devices in accordance with the capabilities, requirements, and locations of the client devices, the network congestion of different frequency bands, and permissible frequencies and power levels. At least one embodiment provides wireless networking spectrum management for Wi-Fi client devices connected in both an infrastructure network (e.g., infrastructure WLAN AP, Wi-Fi docks, combinations thereof, and the like) and a P2P group network (e.g., Wi-Fi Direct/Miracast) simultaneously. At least one embodiment is applicable to wireless networking environments ranging from an enterprise, a remote office, a home, a hot spot, travel environments (e.g., public/private platforms).

In accordance with at least one embodiment, dynamic spectrum channel management and allocation is provided for localized wireless docks. In accordance with at least one embodiment, the wireless dock is the master, controlling selection of wireless networking communication parameter values used by client devices. The wireless dock first consults a list of Television White Space (TVWS) databases. The wireless dock then consults a list of Wi-Fi WLAN AP databases. The wireless dock determines a cumulative list of available channels between TVWS spectrum and Wi-Fi spectrum. The wireless dock then selects its preferred database from the two lists and sends its parameters outlining its location and device attributes. A geo-location database then sends a list of frequencies and power levels the wireless dock is allowed to use. The wireless dock then sends details to a client device of the frequency channels and power levels the client device can use for optimized local WLAN AP connectivity to the wireless dock. At least one embodiment maximizes available (unused) spectrum across both Wi-Fi bands and unlicensed TVWS spectrum, dynamically allocating communication paths based on environmental parameters, location, and crowd sourcing usage.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method in a wireless dock, comprising:
   querying, by the wireless dock, a first wireless networking database to identify a first set of available channels;
   querying, by the wireless dock, a second wireless networking database to identify a second set of available channels;
   receiving, by the wireless dock, an indoor position associated with a client device, the indoor position based on wireless networking signals sent from the client device;
   determining, by the wireless dock, overlapping wireless coverage areas that serve the client device based on the indoor position, the overlapping wireless coverage areas broadcast by multiple access points;

selecting, by the wireless dock, an unlicensed channel associated with a frequency band;

receiving, by the wireless dock, a list of permissible frequencies and power levels determined from the overlapping wireless coverage areas based on the indoor position associated with the client device;

sending, from the wireless dock, a message via the unlicensed channel to the client device, the message specifying use of an available channel, the available channel different from the unlicensed channel, and the available channel corresponding to a single coverage area of the overlapping coverage areas, the single coverage area broadcast by a single access point of the multiple access points;

creating, by the wireless dock, a wireless dock domain that clusters client devices comprising the client device in a peer-to-peer (P2P) group;

switching, by the wireless dock, from the unlicensed channel to the available channel that corresponds to the single coverage area broadcast by the single access point; and communicating, by the wireless device, with the client device using the available channel based on the indoor position, wherein the client device makes a P2P connection with the wireless dock.

2. The method of claim 1, further comprising distributing the available channel to other wireless docks.

3. The method of claim 1, further comprising:
performing a wireless dock inter-domain coordination function, wireless communication load balancing, and wireless communication scheduler updates.

4. The method of claim 1, wherein the first wireless networking database is a television white space (TVWS) database, and the first set of available channels is a first set of available TVWS channels.

5. The method of claim 4, wherein the second wireless networking database is a wireless local area network (WLAN) access point (AP) database, and the second set of available channels is a second set of available WLAN AP channels.

6. The method of claim 1, further comprising selecting the available from channel from at least one of the first set of available channels and the second set of available channels.

7. The method of claim 1, further comprising:
detecting the indoor location of the client device using geographically diverse sensors, the geographically diverse sensors monitoring wireless networking signals emanating from the client device.

8. An information handling system, comprising:
a wireless dock for providing wireless communication with a client device, the wireless dock comprising:
a first wireless networking transceiver utilizing unused frequencies associated with television white space;
a second wireless networking transceiver utilizing other frequencies associated with wireless local area networking; and
a control circuit, the control circuit coupled to the first wireless networking transceiver and to the second wireless networking transceiver, the control circuit executing code that causes the control circuit to perform operations, the operations including:
querying a first wireless networking database to identify a first set of available channels utilizing the unused frequencies associated with the television white space;
querying a second wireless networking database to identify a second set of available channels utilizing the other frequencies associated with the wireless local area networking;
determining an indoor position associated with the client device, the indoor position based on wireless networking signals emanating from the client device;
determining overlapping wireless coverage areas that serve the client device based on the indoor position, the overlapping wireless coverage areas broadcast by multiple access points;
selecting a channel associated with the other frequencies associated with the wireless local area networking;
receiving a list of permissible frequencies and power levels determined from the overlapping wireless coverage areas based on the indoor position associated with the client device;
sending a message to the client device via the channel associated with the other frequencies associated with the wireless local area networking, the message assigning an unused channel broadcast by a single access point utilizing the unused frequencies associated with the television white space;
creating a wireless dock domain that clusters client devices comprising the client device in a peer-to-peer (P2P) group; switching from the channel associated with the wireless local area networking to the unused channel associated with the television white space that corresponds to a single coverage area; and
communicating with the client device via the unused channel associated with the television white space utilizing the first wireless networking transceiver, wherein the client device makes a P2P connection with the wireless dock.

9. The information handling system of claim 8, wherein the operations further comprise distributing the unused channel associated with the television white space to other wireless docks.

10. The information handling system of claim 8, wherein the operations further comprise performing a wireless dock inter-domain coordination function, wireless communication load balancing, and wireless communication scheduler updates.

11. The information handling system of claim 8, wherein the first wireless networking database is a television white space (TVWS) database, and the first set of available channels is a first set of available TVWS channels.

12. The information handling system of claim 11, wherein the second wireless networking database is a wireless local area network (WLAN) access point (AP) database, and the second set of available channels is a second set of available WLAN AP channels.

13. The information handling system of claim 8, wherein the operations further comprise selecting the unused channel from.

14. The information handling system of claim 8, wherein the control circuit is further configured to obtain the indoor location associated with the client device using geographically diverse sensors, the geographically diverse sensors monitoring the wireless networking signals emanating from the client device.

* * * * *